Nov. 21, 1950 G. A. MERCHANT 2,531,072
APPARATUS FOR MINING COAL OR SIMILAR MINERAL
Filed May 4, 1948 9 Sheets-Sheet 1

RELATIVE POSITION OF PICK ARMS

Inventor
George A. Merchant
By
Bacon and Thomas
Attorneys

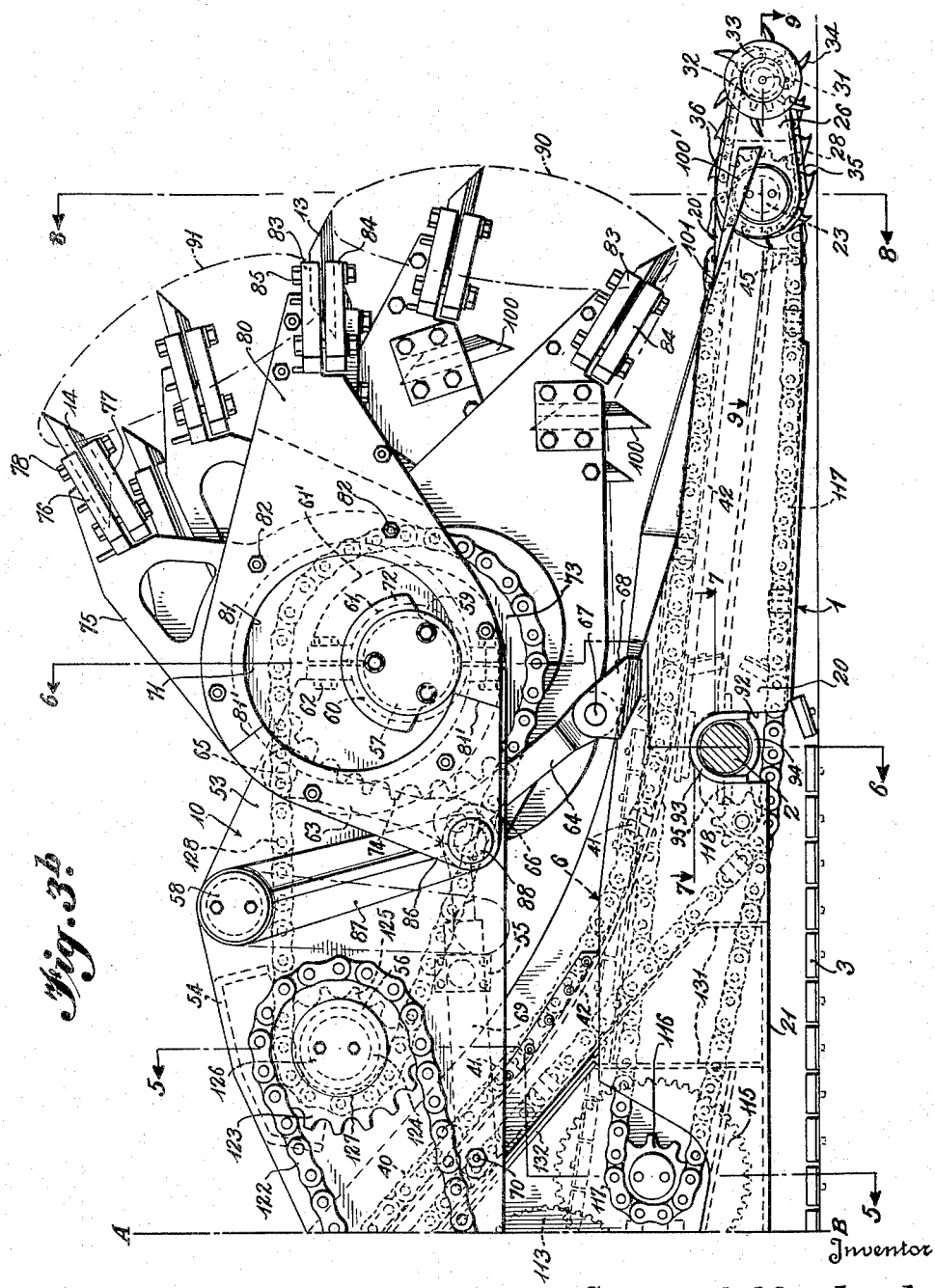

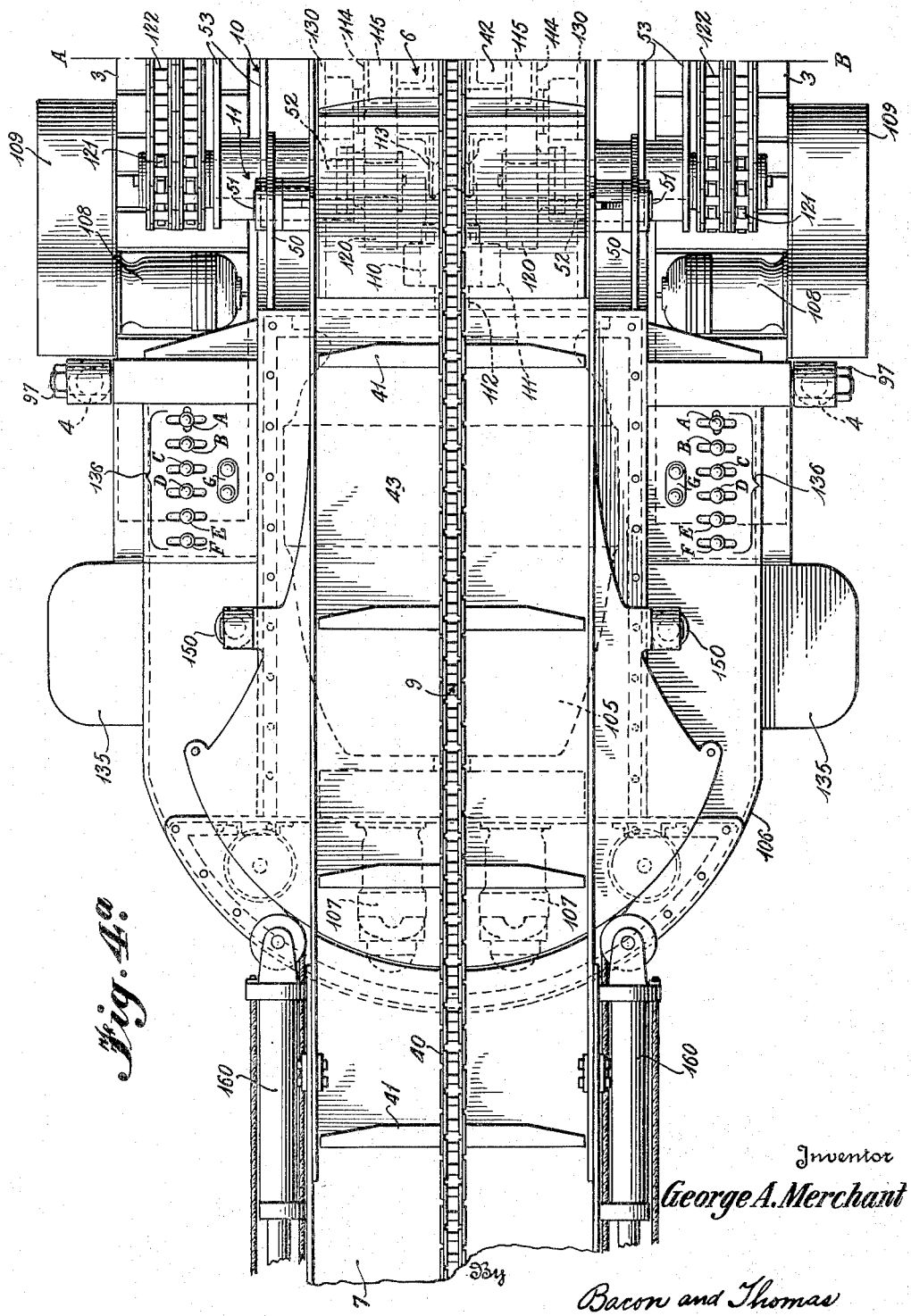

Nov. 21, 1950   G. A. MERCHANT   2,531,072
APPARATUS FOR MINING COAL OR SIMILAR MINERAL
Filed May 4, 1948   9 Sheets-Sheet 5
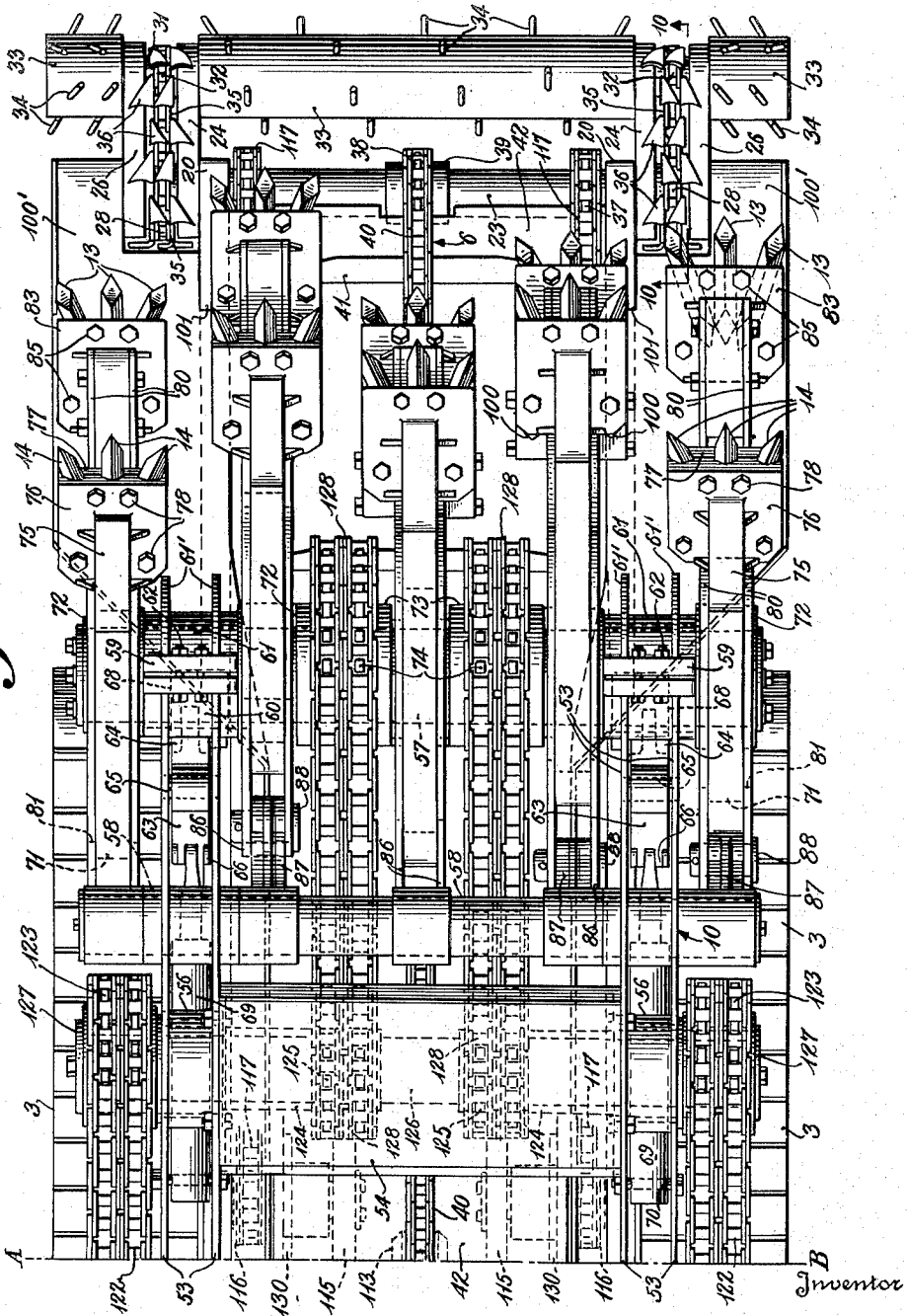
Fig. 4.b
Inventor
George A. Merchant
By Bacon and Thomas
Attorneys Inventor
George A. Merchant
By Bacon and Thomas
Attorneys

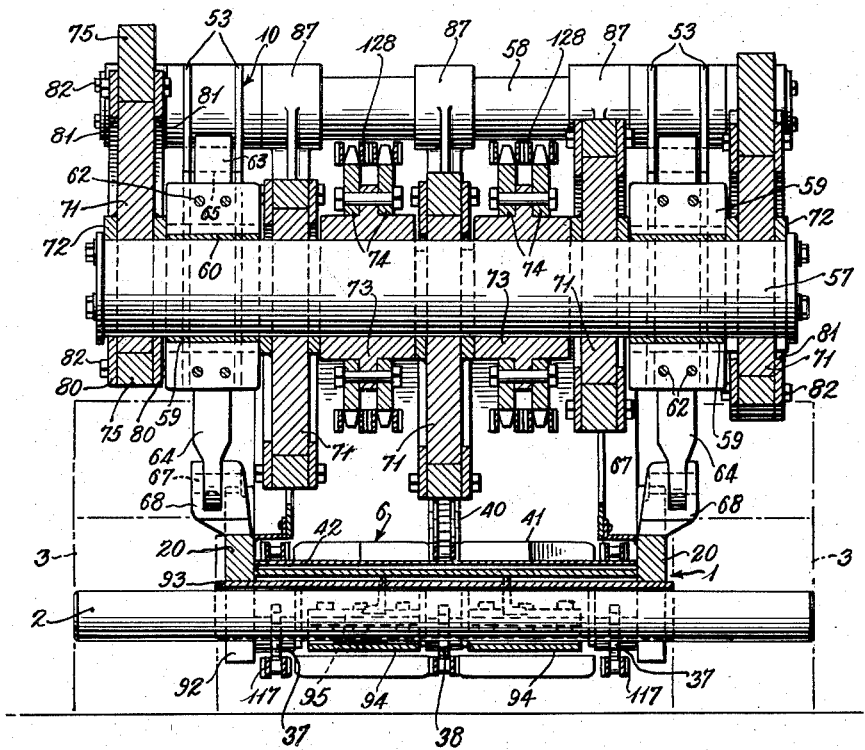
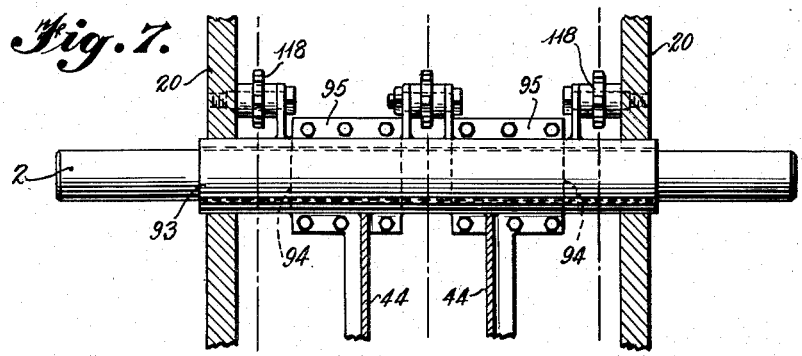

Nov. 21, 1950        G. A. MERCHANT        2,531,072
APPARATUS FOR MINING COAL OR SIMILAR MINERAL
Filed May 4, 1948        9 Sheets-Sheet 8

Inventor
George A. Merchant
By Bacon and Thomas
Attorneys

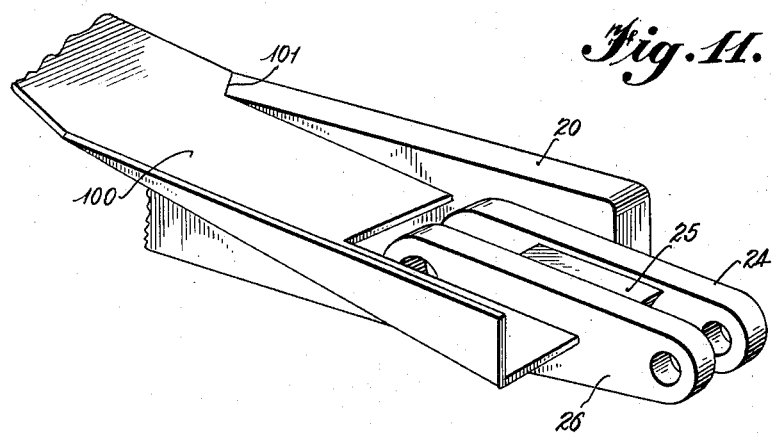
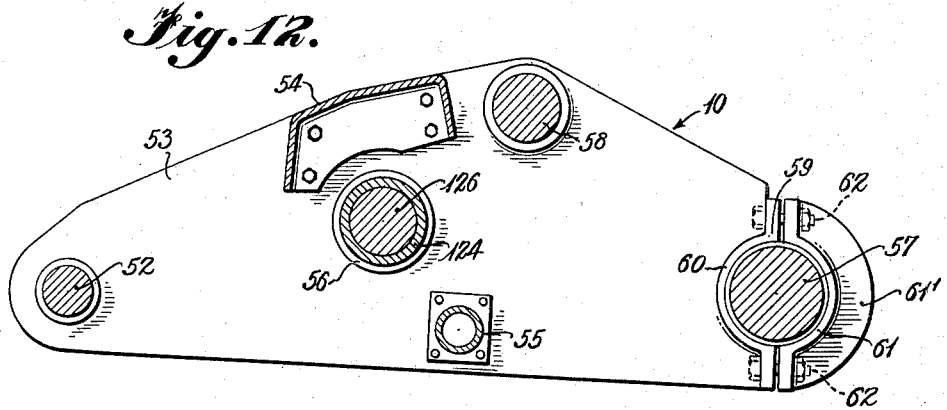

Patented Nov. 21, 1950

2,531,072

UNITED STATES PATENT OFFICE 2,531,072

APPARATUS FOR MINING COAL OR SIMILAR MINERAL

George A. Merchant, River Forest, Ill., assignor to Safeway Mining Machine Corporation, Chicago, Ill., a corporation of Delaware Application May 4, 1948, Serial No. 25,015

19 Claims. (Cl. 262—9)

This invention relates to mining machines and more particularly to a mining machine adapted to continuously remove mineral, such as coal, from a vein without the necessity of performing the sequence of operations heretofore conventional, such as undercutting, drilling, blasting, and loading of the coal. The present invention is directed to a machine that is self-propelled and continually advances toward the working face while undercutting and breaking down the mineral and conveying it to a loading position. This invention constitutes an improvement of the machine described in my Patent No. 2,424,180, of July 15, 1947, and on which application for reissue No. 784,949 was filed on November 10, 1947, and now abandoned.

It is an object of this invention to provide such a machine capable of continuously mining a mineral without the necessity of performing auxiliary operations, such as blasting.

It is another object of this invention to provide a mining machine by which the mineral is not only removed from its natural environment but is broken up into relatively small pieces capable of being easily handled and requiring a minimum of further processing to render it commercially useable.

Another object of the invention is to provide a mining machine that removes mineral from its natural environment by squeezing or crushing the portions of the mineral between relatively movable parts of the machine.

Another object of the invention resides in the provision of means co-operating with one of the above-mentioned relatively moveable parts of the machine to cut an opening or kerf into the face of the mineral whereby the said part may enter into the face to engage a portion of the mineral between itself and the other of the said parts of the machine.

It is another object of this invention to provide a machine of the type described wherein the working range of a breaking down mechanism may be readily adjusted as to height, to accommodate the machine to mineral veins of different thicknesses.

It is a further object of this invention to provide such a machine wherein the broken down mineral is not discharged by the machine unless all pieces are smaller than a predetermined maximum size.

It is a still further object of this invention to provide a machine of the type described that is self-propelled and capable of performing its mining functions without the necessity of laying tracks to support and guide the machine or of anchoring the machine to the roof or walls of a mine.

It is a still further object of this invention to provide a mining machine capable of changing its direction of heading in a vertical plane to conform to changes in the slope of the mining vein.

Further objects and advantages will become apparent to those skilled in the art as the description of a specific embodiment proceeds with reference to the accompanying drawings, in which:

Figs. 3a and 3b are, respectively, left and right end portions of a side elevational view of the machine shown in Fig. 1, but on a larger scale and being more detailed;

Figure 3A:
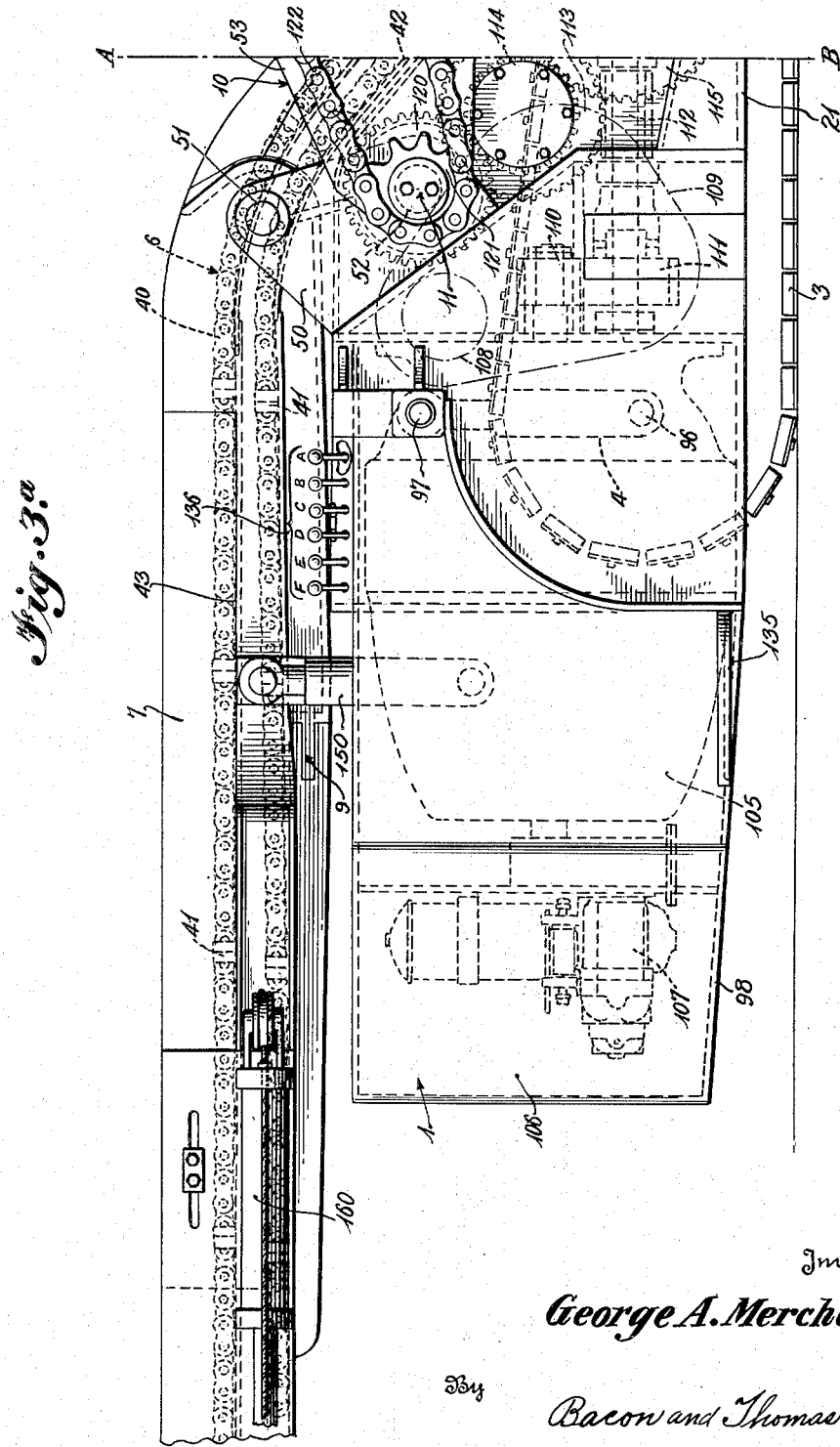
Figure 5:
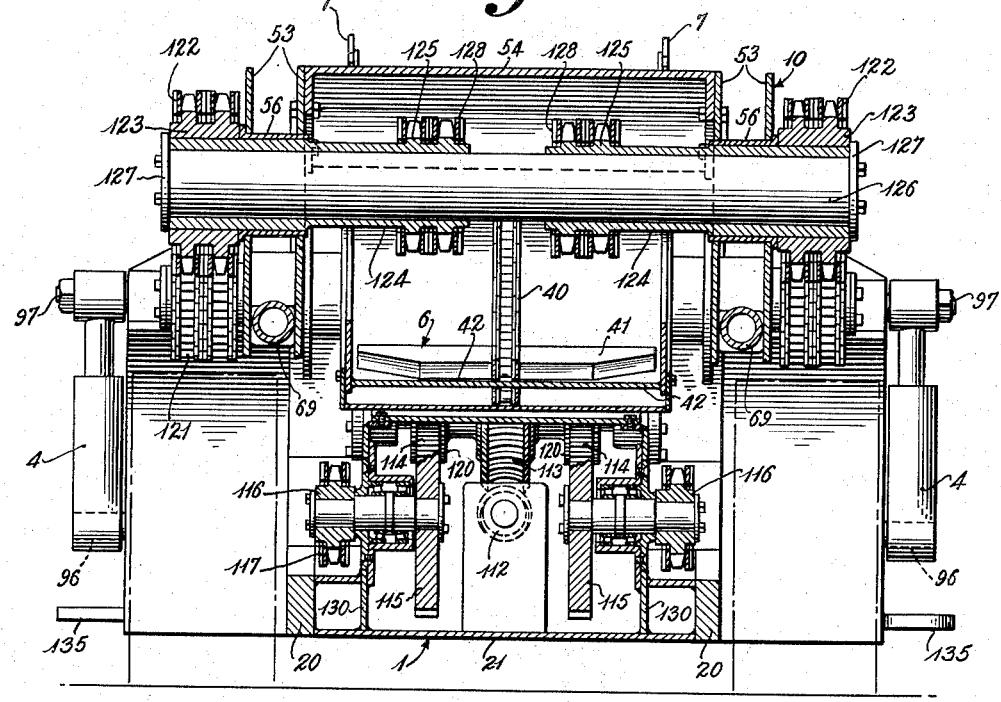
Figure 10:
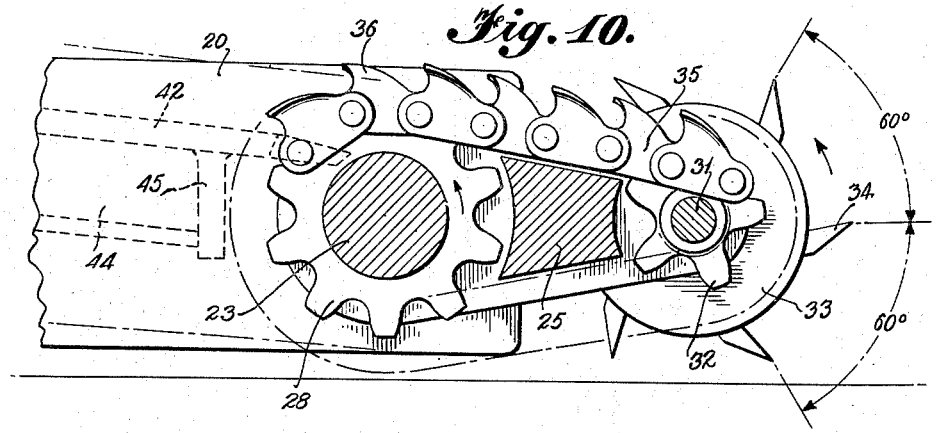
Figure 8:
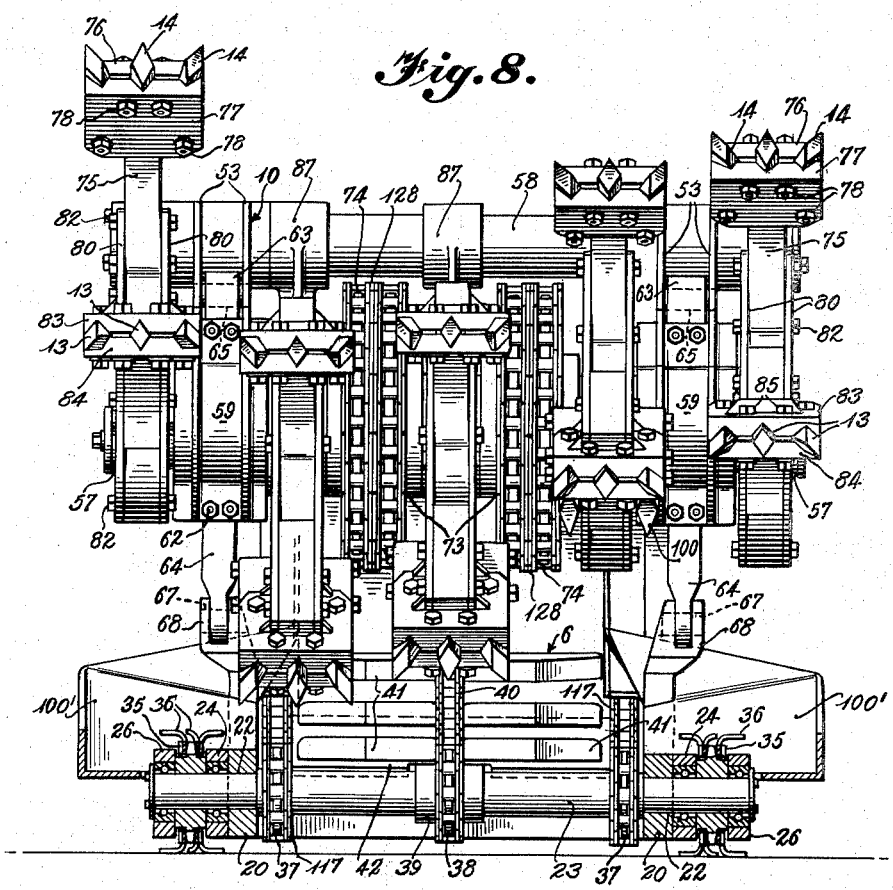
Figure 9:
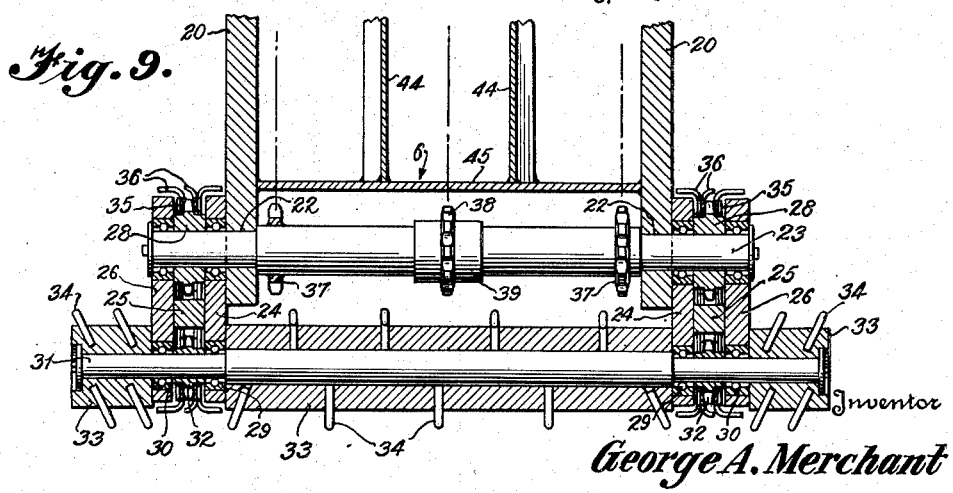

Figs. 4a and 4b constitute, respectively, the left and right end portions of a top plan view of the machine shown in Figs. 3a and 3b;

Fig. 5 is a transverse sectional view through the machine taken on the line 5—5 of Fig. 3b;

Fig. 6 is a sectional view similar to that of Fig. 5, but taken on the line 6—6 of Fig. 3b;

Fig. 7 is a horizontal sectional detail view taken substantially along the line 7—7 of Fig. 3b;

Figs. 8 and 9 are sectional views taken along the lines 8—8 and 9—9, respectively, of Fig. 3b;

Fig. 10 is a sectional view through the undercutting mechanism as taken substantially along the line 10—10 of Fig. 4b, with parts of the cutting chain and other elements being omitted for clarity of illustration;

Fig. 11 is a detail perspective view of a forward portion of the machine frame with certain parts omitted; and Fig. 12 is a longitudinal vertical sectional view through the secondary frame of the machine.

In general, the machine of this invention comprises a main frame 1 (see Fig. 1), pivotally mounted about the front axle 2 of an endless tread carriage 3. Rearwardly of the axle 2 the main frame 1 of the machine is supported from a rear portion of the carriage 3 by an extensible hydraulic jack 4. Upon extension or collapse of the jack 4 the main frame 1 and all its supported mechanisms are tilted about the front axle of the carriage 3 and in this manner the heading of the machine in a vertical plane, may be changed to follow changes in the slope of the vein of mineral being mined. At the forward end of the main frame 1 an undercutting burr 33 is rotatably mounted and so operates as to discharge cut material onto the forward end of a conveyor 6 (not shown in detail in Fig. 1) to be carried thereby rearwardly of the machine then generally upwardly at about the mid point of the frame 1, to an upper horizontal rearwardly extending conveyor portion 7 from which it is discharged into a suitable receiving means such as a mine car. The rear portion 7 of the conveyor is of more or less conventional structure and includes means for tilting the conveyor in a vertical plane about an axis 51 and for swinging the rearmost portion about a vertical axis substantially at 9.

A secondary frame 10 is pivoted to the main frame 1 about a transverse axis at 11. A toggle linkage, shown in part at 64, is operable to tilt the secondary frame 10 about the axis 11 relative to the main frame 1. A plurality of breaking down picks 13 and 14 are mounted on the said secondary frame 10 and so driven by the eccentrics 71 as to be given an orbital path in a vertical plane in which they move downwardly along the forward portion of their paths.

The main frame 1 also includes forwardly projecting portions having upper surfaces 16 in such position that they just enter into the kerf 17 cut by the burr 33 in the mineral material and bear against the downwardly facing surface 18 of the said kerf. As the machine advances the breaking down picks 13 enter into the face of the mineral and upon downward movement will break down the mineral therebelow between itself and the surfaces 16 and the picks 14 will break down the mineral that has been "undercut" by the picks 13.

The secondary frame 10 extends transversely across the machine with its major portion above the conveyor and its axis 11 therebelow and the broken down material moves along said conveyor under and through said secondary frame. In the event unusually large lumps of mineral fall onto the conveyor, they might interfere with the proper operation of the breaking down mechanism or the conveyor when they attempt to pass through the secondary frame 10. To prevent such interference, means are provided on certain of the picks 13 (means not shown in Fig. 1) so that upon movement of the picks 13 to their lowermost position any such large lumps will be crushed and broken to small sizes capable of being easily conveyed through the machine without interference.

A signal electric motor, furnishing all the power requirements for the machine, is housed in the rearmost portion of the frame and a group of controls 136 operates clutches or hydraulic valves to selectively control the various functions, all of which will be described in greater detail later. The motor operates a pair of hydraulic pumps which provide a source of suitable fluid under pressure to operate hydraulic motors and other means to be described. Each of the said motors is arranged to drive one of the endless treads of the carriage 3.

Referring now to the more detailed figures of the drawings, the main frame 1 of the machine comprises a pair of side members 20 (see Fig. 5) of the desired configuration and a plurality of cross plates such as shown at 21 welded or otherwise secured to the side plates 20 to hold the entire frame structure as a rigid unit. The side members 20 of the main frame 1 extend forwardly at the bottom thereof and are provided with transverse openings 22 (see Fig. 9) through which a rotatable cross-shaft 23 extends. Also attached to the forward outside edges of the forwardly extending portions of the members 20 are the extension plates 24, the spacers 25, and the outside plates 26. The plates 24 and 26 and the spacers 25 are attached to the frame members 20 in any suitable manner. The shaft 23 extends outwardly beyond the members 20 and through aligned bearings in the plates 24 and 26 and a sprocket wheel 28 is keyed to or otherwise rigidly mounted on the said shaft 23 in the space between the plates 24 and 26. Forwardly of the spacers 25 the plates 24 and 26 are provided with aligned bearings 29 and 30 in which a transverse shaft 31 is journalled. A sprocket wheel 32 is keyed or otherwise rigidly fastened to the shaft 31 between the plates 24 and 26 and is in alignment with the sprocket wheel 28 on the shaft 23. Outwardly of the plates 26 and inwardly of the plates 24 the shaft 31 carries enlarged cylindrical members 33 which are provided with a plurality of projecting points 34 and constitute in their entirety an undercutting burr. The points 34 will, of course, be so spaced and positioned that they will cut a continuous transverse kerf without uncut portions of mineral remaining between the ends of the cutting burr except directly forwardly of the bearings 29 and 30 and the sprocket wheel 32. A link-type chain 35 is trained about the sprocket wheels 28 and 32 (see Fig. 10) and is effective to not only drive the shaft 31 from the shaft 23 but also to cut the mineral in advance of the bearings 29 and 30 and the sprocket wheel 32. The chain 35 is of the type known as a cutting chain and is of more or less conventional construction, wherein each of the links is provided with an outwardly extending tooth portion 36. As best shown in Figs. 8 and 9, each of the teeth 36 is bent laterally and the chain as a whole will cut a kerf considerably wider than the sprocket wheels on which it is mounted. In the present instance the parts are so designed and proportioned that the width of the kerf cut by the chain 35 is substantially equal to the combined thicknesses of the plates 24 and 26 and the spacer 25, thus clearing the way through the mineral for the bearings 29 and 30 and the sprocket wheel 32. All of the structure just described is duplicated, in reverse, at the other side of the machine, as clearly shown in Fig. 9 of the drawings.

The shaft 23, which is rotatably mounted at the forward ends of the frame members 20, has rigidly mounted thereon a pair of sprocket wheels 37 inwardly of the frame members 20. The shaft 23 is driven by a dual chain drive to the sprocket wheels 37 from a source of power at the rear of the machine all of which will be described later. At substantially the mid portion of the shaft 23 a sprocket wheel 38 is mounted and connected to the shaft 23 through a slip clutch, indicated generally at 39. The clutch 39 may be a friction type slip clutch if desired, or may be any other suitable type of clutch mechanism capable of transmitting torque up to a maximum value and which will "slip" upon any increase in the torque over that maximum value. In other words, the shaft 23 is capable of driving the sprocket wheel 38 as long as the resistance to rotation of the wheel 38 does not exceed a predetermined value. If that value is exceeded the clutch 39 will slip, or disengage, and the shaft 23 may continue to rotate even though the sprocket wheel 38 is prevented from rotating. The clutch 39 will not be described in detail since clutches of this type are readily available and well-known in the prior art.

The sprocket wheel 38 drives an endless link-type chain 40 (see Fig. 4b) which carries a plurality of cross cleats 41. The chain 40 and cleats 41 rest upon and slide over a plate 42 (see Fig. 6) constituting the bottom of the conveyor. As is apparent from Figs. 3a and 3b, the plate 42 extends rearwardly from the shaft 23, then upwardly through the secondary frame 10 over the axis 11 to an upper generally horizontal rearwardly extending portion, indicated at 43 in Fig. 3a. The conveyor structure, per se, will not be described in any greater detail since it is a well-known type of conveyor which is illustrated and described in detail in the patent to Arentzen, 1,785,402, issued December 16, 1930. As shown in Fig. 3b, the bottom plate 42 adjacent the forward portion of the machine is considerably thicker than the remaining portion of the said plate and is braced intermediate the frame members 20 by vertical plates 44 and 45 (see Figs. 7 and 9). The thickened portion of the plate 42 and the plates 44 and 45 are rigidly united as by welding or otherwise, to provide a rigid platform extending between the frame members 20 and capable of withstanding large downward pressures.

Figure 1:
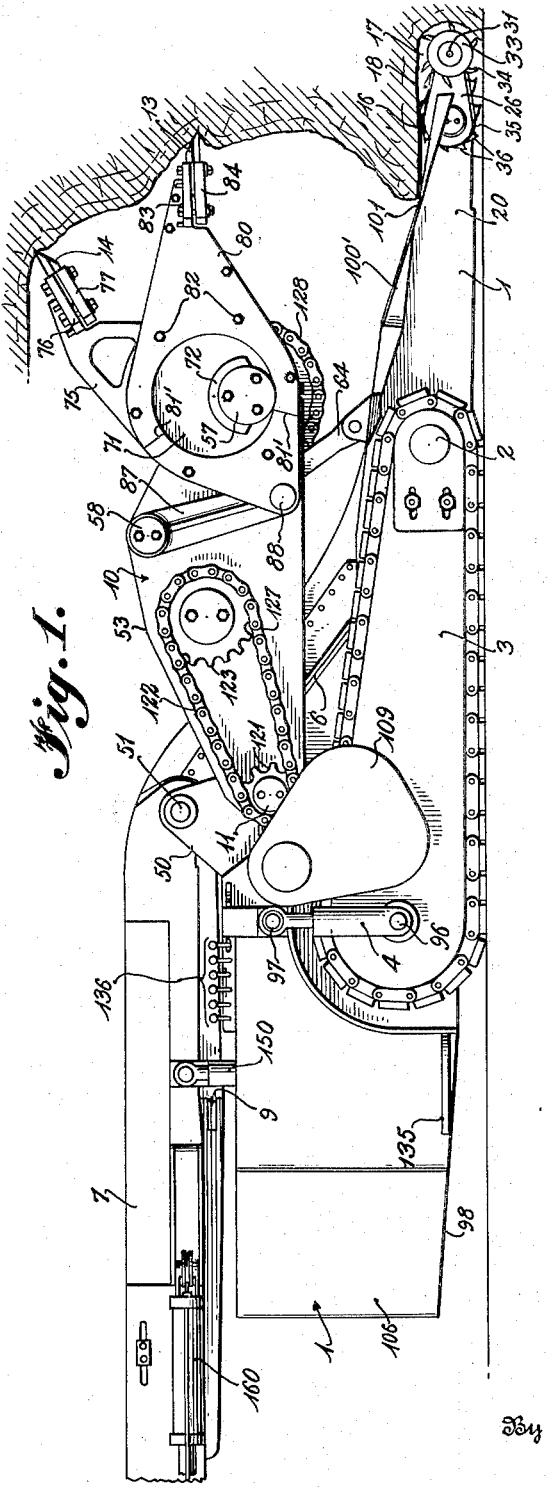
Fig. 1 is a side elevational view of a preferred form of the invention, but with certain parts omitted.

Referring to Fig. 1, it will be seen that the upper surfaces 16 of the frame members 20 lie in a plane substantially tangent to the outer periphery of the cutting elements 34 on the undercutting burr 33. Thus it will be readily apparent that as the undercutting burr advances into the face of the mineral material the upper surfaces 16 of the frame will be in position to just contact the downwardly facing surface 18 of the kerf 17.

Referring now to Figs. 3a and 3b, the frame members 20 extend upwardly at the mid-portion thereof to provide upwardly extending ears 50. The ears 50 are provided with bushings 51 in which trunnions on the conveyor portion 7 are mounted.

The ears 50 also support axially aligned transverse stub shafts 52 journalled therein (Fig. 4a). The shafts 52, in addition to being journalled in the ears 50, constitute a pivotal mounting for the rearmost portion of the secondary frame 10 and their aligned axes constitute the axis 11 referred to above in connection with Fig. 1.

The secondary frame 10 comprises a pair of side members, each of which includes a pair of spaced parallel plates 53 (see Fig. 5). The innermost plates 53 are joined by a spreader element 54 rigidly attached thereto (see also Fig. 12) and a further spreader element 55 adjacent the bottom edges of the said plates 53. The further spreader element referred to is indicated generally by the numeral 55 appearing in Figs. 3b and 12. It will be apparent that the spreaders being rigidly attached to the innermost plates 53, will maintain the said plates assembled as a rigid unit. Bushings 56 (see Fig. 5) extend through aligned openings in each pair of plates 53, and the bushings 56 are in axial alignment with each other. At their rearmost portions all of the plates 53 are provided with aligned openings in which the shafts 52 are journalled and suitable bushing means are provided which also act to properly space the rear most ends of each pair of plates 53. At their forward ends (Figs. 6 and 12) the plates 53 are provided with transverse bushings 59 in which a shaft 57 is journalled. The bushings 59 also act to properly space each of the plates 53 of each pair at their forward ends.

At the upper mid-portion of the plates 53, a further transverse shaft 58 is mounted on the said plates with spacers around the shaft and between the plates 53 of each pair. The shaft 58 acts as a further rigidifying element in addition to performing another function, to be described later. The shaft 57, referred to above, is journalled in bushing elements 59 which are provided by a rear semi-cylindrical portion 60 rigidly attached to the plates 53 and a separable semi-cylindrical forward portion 61 (see Fig. 12). The forward portion 61 may be removed by removing the bolts 62, whereupon the shaft 57 can be dismounted by merely moving it forwardly. As shown in Fig. 12, the forward portions 61 carry reinforcing flanges 61' in alignment with the plates 53.

The structure thus far described in connection with the secondary frame 10 provides a secondary frame pivotally mounted on a transverse axis 11 on the main frame 1. Means are provided for pivotally adjusting the secondary frame 10 about the said axis 11 and comprises a pair of toggle linkages. Each toggle linkage consists of an upper link 63 (Fig. 3b) and a lower link 64. The upper link 63 is located between the plates of a pair of side plates 53 and is pivoted at its upper end to said side plates, as at 65. At its lower end the link 63 is pivoted to the upper end of the link 64 as at 66 and the lower link 64 is pivoted at 67 to a bracket 68 attached to the main frame 1 of the machine. A hydraulic jack 69 is pivoted to the central pivot 66 of the toggle linkage and is pivoted at its other end to the main frame 1 of the machine, as at 70. The portion of the hydraulic jack 69 pivoted at 70 constitutes the outer or cylinder portion of the jack and the portion pivoted to the toggle linkage at 66 may be the plunger or piston part of the jack. Clearly, however, the jack could be reversed and would operate in the same way. It will be apparent that with the parts in the positions shown in Fig. 3b hydraulic pressure may be admitted to the jack 69 (by means not shown in the drawings) and the resulting extension of the jack will expand the toggle linkage 63—64 to thereby pivot the secondary frame 10 upwardly about the axis 11. It is contemplated that two such linkages and jacks be provided, one on each side of the machine between each pair of plates 53.

Figure 2:
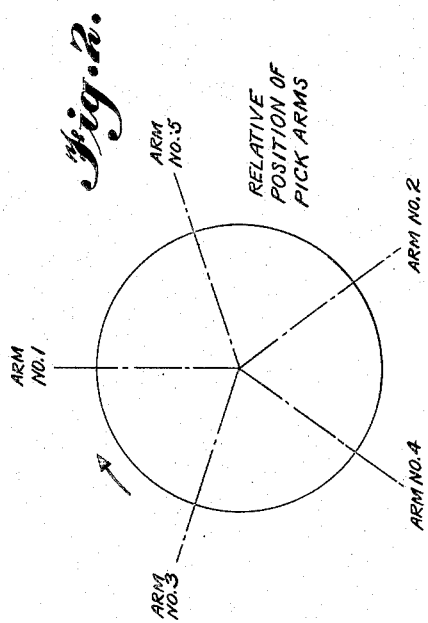
Fig. 2 is a schematic illustration of the relationship between the centers of the driving eccentrics on their supporting shaft.

The transverse shaft 57, journalled in the secondary frame 10 as described above, constitutes a supporting and driving shaft for the mineral breaking down means. In the embodiment shown the shaft has mounted thereon a plurality of (in this case 5) eccentrics 71. Each of the eccentrics 71 is rigidly attached to the shaft 57, as by keys, welding or the like, and the eccentrics are equally spaced axially of the shaft 57. The center of each eccentric 71 is displaced from the axis of the shaft 57 and the distance it is so displaced defines the "throw" of the eccentric. Referring to Fig. 2, it will be seen that each of the eccentrics is angularly displaced from each of the others so that the centers thereof are evenly angularly spaced about the axis of the shaft 57. By this arrangement only one eccentric moves forwardly at the top of its stroke at any given time. A plurality of generally semi-circular elements 72 (Figs. 3b and 6) are welded or otherwise secured to opposite faces of each eccentric and constitute reinforcing means to provide a greater pressure transmitting area between the eccentrics and the shaft 57 on the sides thereof on which the greatest pressures are involved. A pair of dual sprocket wheels 73 (Fig. 6) is also keyed or otherwise rigidly secured to the shaft 57 and in this particular embodiment one of the dual sprocket wheels 73 is mounted to the shaft 57 on each side of the central eccentric of the group. Each of the sprocket wheels 73 is provided with dual sprocket chain engaging means 74, which may take the form of annular toothed rings bolted to outwardly extending flange portions of the wheels 73 to form a unitary structure.

Each of the eccentrics 71 supports and drives a pick arm, and since the pick arms on all the eccentrics are of the same construction only one will be described in detail. Referring to Figs. 3b and 6, an inner member 75 is provided with an opening therethrough of such diameter as to snugly receive the eccentric 71 therein with a smooth working fit, whereby the member 75 is journalled to the periphery of the eccentric 71. If desired antifriction bushings or bearings may be provided between the members 75 and the eccentrics 71. Each member 75 has a portion projecting generally radially of the eccentric and terminating in a pick head comprising a block element 76 rigidly fixed thereto as by welding, or the like. Each of the blocks 76 is provided with a plurality of (in this case 3) forwardly diverging grooves or channels of generally V-shape (see Figs. 4b and 8). In each of the above-mentioned grooves a pick point 14 is positioned and a cap plate 77, similarly grooved, is bolted to the block 76, as by bolts 78, and acts to clamp the pick points 14 rigidly to the inner member 75. By this structure the pick points 14 may be removed for sharpening or for replacement, or may be reversed in the clamping structure if provided with a point at each end, as in the embodiment illustrated.

A second portion of each pick arm comprises a pair of parallel spaced-plates 80 (Figs. 3b, 4b and 6). Each plate of the pair has an opening 81 aligned with the corresponding opening of the other plate and each of the openings is of a diameter somewhat less than the diameter of the eccentric 71. The plates 80 are attached to the central member 75 as by a circular series of bolts 82 and the central member 75 is of a thickness at least equal to the thickness of the eccentric 71, and preferably slightly thicker whereby the edges of the openings 81 extend inwardly of the periphery of the eccentrics 71 and the plates 80 adjacent the said openings 81 bear against the side faces of the said eccentrics 71. Each of the plates 80 may consist of two separable portions with their edges in abutment at 81 to facilitate assembly and disassembly of the structure. By this arrangement it will be seen that the pick arm comprising the central member 75 and the plates 80 is journalled to the periphery of the eccentric 71 and yet is fixed against axial displacement relative to the eccentric. Each of the pair of plates 80 extends forwardly of the eccentric below the pick head portion 76 of the central member 75 and a block 83 is bolted or otherwise rigidly secured to each plate 80 of the pair, thus acting as spacing means and as means to rigidly unite the plates into a unitary structure. The blocks 83 are grooved in a manner similar to the blocks 76 described previously, and receive a plurality of pick points 13 clamped thereto by cap plates 84 and bolts 85 in the same manner as described with reference to the pick head on the central member 75. By this construction a unitary pick arm is provided having a pair of pick heads thereon with said pick heads in fixed relationship to each other and with one pick head always forwardly of and below the other. Adjustment of the spacing between the pick heads of each pick arm can be accomplished by removing the bolts 82 and by rotating the central member 75 about the periphery of the cam 71 to bring different bolt holes into alignment, and upon replacing bolts 82 in the newly aligned bolt holes the parts are held in the adjusted relationship. The spacing between the bolts 82 and their holes may, of course, be chosen to give the desired increments of adjustment or extra holes may be provided in either member.

Each of the plate 80 of each pair extends rearwardly of the eccentric 71 and terminates in a perforated portion 86, the perforations in each plate being in axial alignment with each other. A plurality of rocker arms 87 are freely and independently journalled on the shaft 58, described previously. An arm 87 is provided for each eccentric and is located immediately therebehind. Each of the rocker arms 87 extends downwardly from the said shaft 58 and between the perforated portions 86 of the plates 80. A pivot pin 88 extends through the perforations in the plates 80 and also through an opening in the lowermost portion of the arm 87. The arm 87 functions as a guide for the rearmost portion of the pick arm to guide that portion in a generally fore and aft direction, in this case arcuate, in a vertical plane. By the arrangement just described each pick arm is given a predetermined movement. As the shaft 57 and the eccentrics 71 rotate in a clockwise direction, as seen in Fig. 3b, it will be clear that an intermediate portion of the pick arm is caused to move in a circular path in a vertical plane, and since the rearmost portion of the pick arm is confined to a path of movement determined by the rocker arm 87, the pick points 13 and 14 will be caused to move in orbital paths 90 and 91 in a vertical plane, moving forwardly at the tops of their paths, then downwardly, rearwardly, and upwardly.

In the embodiment described above the picks on the outer member of the pick arm have been shown as being below and forwardly of the picks carried by the central member 75, however, as an equivalent arrangement, the members could be so shaped that the lower and foremost picks would be carried by the central member 75. In such an arrangement the outer member would be shaped so as to position the pick head carried thereby in the position of the upper pick head 76 shown in the drawings.

The side members 20 of the main frame 1 are provided with recesses 92 extending downwardly through the lower edges thereof (Fig. 3b) and a transversely extending semi-cylindrical bearing element 93 extends across the frame of the machine and into the recesses 92. The bearing element 93 constitutes an upper bearing surface for the front axle 2 of the endless tread carriage 3, referred to previously. Spaced retaining plates 94 (Figs. 3b, 6, and 7), of generally semi-cylindrical shape, extend about the lower surface of the axle 2 and are bolted to ears 95 extending outwardly from the bearing element 93 to retain the axle 2 in bearing engagement with the element 93 at all times. This bearing construction provides a sufficiently large bearing area between the main frame of the machine and the axle 2 to withstand the great weight of this machine, and provides a pivot about which the machine frame may be tilted in a vertical plane. To effect such tilting of the main frame of the machine the hydraulic jack 4 (Figs. 1 and 3a) has its barrel or body portion pivoted to the endless tread carriage at 96 and has its plunger pivoted at 97 to a bracket on the main frame 1 of the machine. When fluid under pressure is admitted to the jack 4 (by means not shown) the jack will be extended, lifting the rearmost portion of the machine, that is, the portion behind the axle 2, thus tilting the entire machine about the said front axle 2. In like manner the fluid within the jack 4 may be allowed to escape, thus lowering the rearmost portion of the machine frame and tilting the entire machine in the opposite direction. The rearmost portion of the machine, which houses the drive motor (to be described later) is provided with a bottom plate 98 extending rearwardly and upwardly to give greater clearance whereby the frame may be tilted a greater amount before the rearmost part of the frame contacts the ground.

During operation of the machine described, it may happen that unusually large lumps of the mineral being mined will be broken from the vein, that is, lumps too large to be carried by the conveyor beneath and through the secondary frame 10. To break such lumps the intermediate pick arms, that is, those located directly over the forward portion of the conveyor, are provided with downwardly directed breaker points 100, secured thereto in any suitable manner. As previously described, the bed plate 42 of the conveyor at the forward part of the machine is relatively thick and well-braced by the plates 44 and 45 and it is upon this plate that such large lumps will rest. When unusually large lumps fall upon the plate 42 during operation of the machine, the central pick arms, in their downward movement, will force the breaker points 100 into the large lumps and crush them to smaller sizes on the plate 42. At the lowermost portion of their orbital paths the pick heads approach the plate 42 rather closely and will be effective to break up any mineral thereon to relatively small-sized pieces. During such breaking of large lumps it will be apparent that an appreciable period of time elapses while the breaker points 100 are in contact with the lumps and pressing those lumps against the plate 42. During that period of time the lumps so clamped between the pick heads and plate 42 will resist movement of the conveyor cleats 41 and would result in breakage of the said cleats or other portions of the conveyor if safety means were not provided. The slip clutch 39, previously described, constitutes such a safety means. When the action of breaking large lumps on the plate 42 results in stoppage of the conveyor chain and cleats the shafts 23 can continue to rotate while the conveyor is held stationary. As soon as the lumps are broken and the pick heads start to move upwardly, the clutch 39 will then again become effective to drive the conveyor and move the broken material to the rear of the machine.

From an inspection of Figs. 4b, 6 and 8, it will be seen that of the five pick heads shown in this specific embodiment, three are located between the pairs of plates 53 of the secondary frame 10 and that the shaft 57 extends laterally beyond said plates 53 and the outermost pick heads are mounted laterally outwardly of the secondary frame 10. The pick points themselves, carried by the pick arms, are so spaced that the spacing between the pick points 13 or 14 on any one pick arm is substantially equal to the spacing between the outermost points on said arm and the adjacent pick points on the next adjacent pick arm, thus providing for substantially uniform breaking of the mineral from the working face across the entire width of the machine. This feature can best be seen in Fig. 4b and Fig. 8. The overall working width of the breaking down structure is as great as the width of the machine itself, and the outermost pick points are the laterally outermost elements of the machine so that material removed from the working face by this machine will leave a tunnel or opening sufficiently wide to receive the machine itself. For a like reason the undercutting burr 33 extends laterally beyond the frame of the machine to cut a kerf substantially equal in width to the distance between the outermost pick points on opposite sides of the machine.

The conveyor mechanism extends forwardly to a point just to the rear of the undercutting burr 33 and the burr 33 is rotated in a counterclockwise direction, as seen in Fig. 3b, and at such speed that the cuttings from the said burr are carried upwardly and thrown backwardly on to the conveyor plate 42. Since the conveyor, however, extends laterally only between the frame members 20, the portion of the undercutting burr outside the frame members 20 are not in position to throw their cuttings on to the conveyor, and since the frame members 20 engage the top surface of the undercut kerf, means must be provided to convey the cuttings from the outer portions of the burr and from the cutting chain 35 onto the conveyor. Laterally extending plates 100 (Fig. 11) are attached to the frame member 20 and extend laterally outwardly thereof a distance equal to the lateral projection of the undercutting burr. The said plates 100 extend substantially horizontally laterally from the point 101 and then slope downwardly and forwardly to a position below the top surface of the undercutting burr and are shaped to conform to the outline of the supporting structure comprising plates 24 and 26 and have portions extending forwardly adjacent the outer ends of the undercutting burr. Rearwardly of the point 101 the plates 100 slope upwardly and laterally outwardly from the upper surface of the frame member 20, whereby cuttings thrown onto said plates by the outermost end portions of the undercutting burr 33 and the cutting chain 35 will be forced rearwardly along the plates 100 and then inwardly onto the conveyor where they will be carried to the rear of the machine. The forward portions of the plates 100 are not necessary and may be dispensed with entirely since the cuttings from the outermost portions of the burr 33 and the chain 35 could be allowed to fall on the mine floor where they would be engaged by a transverse plate or scraper and moved out of the path of the endless treads.

In the embodiment shown a single motor 105 furnishes the entire power requirements of the machine. The motor 105 is mounted on the main frame of the machine and enclosed by a dust-proof housing 106. Also mounted in the housing 106 is a pair of hydraulic pumps 107 (see Figs. 3a and 4a) driven by the motor 105. Each of the pumps 107 provides fluid under pressure to operate the hydraulic motors 108. Each of the motors 108 is connected through a power transmission means (not shown) in housings 109 to the endless tread mechanism whereby the machine is driven hydraulically in its travel. The motors 108 are individually controlled whereby they may be driven in unison or at differential rates to effect straight forward or reverse motion of the machine or horizontal turning motion.

The motor 105 drives through gears 110 and 111 to a worm 112. The worm 112 meshes with the input gear 113 (Figs. 3a and 5) of a differential gearing mechanism. The construction of the differential is not shown in detail, since such mechanisms are well-known and adapted to a large variety of modifications. Any suitable differential mechanism may be employed in this machine at this point. Hereafter, reference to a "differential" will be intended to refer to a mechanism having an input means to receive drive from the source of power and two output means, each of which is effective to transmit power, and the rate of power transmission from each of the output means being equal as long as the loads thereon are equal, with the rates being automatically variable in accordance with the load. The output means of the differential are constituted by a pair of gears 114. A pair of gears 115 (Fig. 5) is journalled in the main frame of the machine. Each gear 115 is individually mounted and rigid on a shaft journalled on the main frame and carrying at its outer end a sprocket wheel 116. Each of the sprocket wheels 116 drives a sprocket chain 117 which extends over idler wheels 118 (Figs. 3b and 7), just behind the front axle 2, and thence to the sprocket wheels 37 on the shaft 23 previously described. The chains 117 are effective to drive the conveyor through the clutch 39, and the undercutting burr 33 through the sprocket wheels 37, shaft 23, and chains 35. As indicated in Figs. 3b, 9 and 10 of the drawings, the sprocket wheels 28 are considerably larger than the sprocket wheels 32, which they drive. It will be apparent that the conveyor must move at a relatively low speed and that the undercutting burr must rotate at a relatively high peripheral speed to effect efficient cutting of the mineral and to throw the cuttings rearwardly onto the conveyor. The relative diameters of the sprocket wheels 28 and 32 will effect such a differential speed between the conveyor and undercutting burr. If desired, a greater speed differential between the conveyor and burr may be produced by interposing additional gearing between the shaft 23 and the shaft 31. Any desired speed ratio could be provided by many well-known means.

The output gears 114 of the differential described also mesh with gears 120. The gears 120 (of which there are two) are each mounted on one of the stub shafts 52 whereby they may rotate independently of each other, and each shaft 52 has fixed thereto a sprocket wheel 121 outwardly of the side plates 53 of the secondary frame 10. In this particular instance each of the sprocket wheels 121 comprises a pair of wheels rigidly connected together. A plurality of sprocket chains 122 extend from the said sprocket wheels 121 to sprocket wheels 123. There are two sets of chains 122 and sprocket wheels 121 and 123, one set being on each side of the machine and each set deriving its drive from a different output means of the differential. Each of the sprocket wheels 123 (Fig. 5) is rigidly mounted on a sleeve 124 journalled in a bushing 56 previously described and each has a pair of toothed portions to engage the chains 122. Each of the sleeves 124, at its inner end, is provided with sprocket wheels 125. A shaft 126 extends through the sleeves 124 and is effective to maintain said sleeves in alignment but is freely rotatable therein. Cap plates 127 are bolted or otherwise attached to the end faces of the shaft 126 and extend radially beyond the periphery of the said shaft sufficiently far to bear against the outer ends of the sleeves 124. The inner edge of each of the sprocket wheels 123 constitutes a shoulder in abutment with the outer end portion of the adjacent bushing 56. By the arrangement described the sleeves 124 are capable of independent rotation but are held in axial alignment and against axial displacement by the shaft 126 and the cap plates 127 and by the bushings 56 bearing against the sprocket wheels 123. Endless sprocket chains 128 are trained over the sprocket wheels 125 and extend about the sprocket wheels 73, previously described as rigidly mounted on the drive shaft 57 (Fig. 6). By the dual drive system just described, applicant has provided a drive system capable of transmitting very large torques without the necessity of providing unduly large driving chains. The drive system enables large torques to be transmitted with all the advantages of smaller standard-sized sprocket chains and wheels without the disadvantage usually inherent in dual-chain systems. In dual-chain systems the tension in the chains and the relations between the sprocket wheels of each line of drive must be so carefully regulated that equal forces will be transmitted through each of the chains of the system and in the event one of the chains or wheels wears faster than the others, backlash is introduced which renders that one line of drive ineffective since the remaining chains and sprocket wheels will have to carry the entire load. By the system just described, applicant is enabled to employ a dual-drive system wherein introduction of backlash in either line of drive will not result in the other line of drive assuming the entire load since the differential would be effective to permit relative rotation of the elements in the two lines of drive to the degree necessary to make both lines of drive assume their full share of the power transmission.

A further advantage of the dual-drive system described above resides in the fact that the sprocket wheels 120, the chains 122, and the sprocket wheels 123 are located outside the side plates 80 of the secondary frame 10, thus leaving considerable space between said side members free to accommodate the conveyor and mineral which pass therethrough. The side plates 80 thus function also as shielding means for the chains 122 to prevent particles of mineral, being moved rearwardly by the conveyor, from fouling the said chains 122.

The differential and the associated gear mechanisms located between the side members 20 of the frame are enclosed in a housing provided by plate 21 (Fig. 5), plates 130, and plates 131 (Fig. 3b) and 132 which are all welded or otherwise joined to form a dust-tight housing about the differential and related gears.

As an alternative to a single motor, it may be found advantageous, in certain instances, to employ a plurality of smaller motors. For instance, a single electric motor could be employed to operate the hydraulic pumps to furnish fluid under pressure to the various hydraulic mechanisms described and separate electric motors could be employed for each line of drive to the undercutter, conveyor, and break-down picks. This latter arrangement would eliminate the need for the differential described above.

Adjacent the housing 106 at the rear of the machine, and on each side thereof, a platform 135 is provided for the operator of the machine. A plurality of control levers, indicated generally at 136, are located within easy access of each of the platforms 135. The controls 136 on one side of the machine are duplicates of the controls 136 on the other side of the machine and are so interconnected (by means not shown) with the opposite controls that each and every function of the machine may be controlled from either platform 135. Thus the operator may assume a position on either side of the machine and effectively control its operation. In the illustrated embodiment six controls are shown. The control lever indicated at A is capable of movement either transversely of the machine or in a fore-and-aft direction and this lever is employed to control operation of the endless treads of the carriage 3. Manipulation of the control lever A will operate valves (not shown) to control the flow of pressure fluid to the motors 108, whereby movement of the lever in a forward direction will effect forward travel of the machine in a straight line by driving both treads at the same speed, and movement of the lever A in a rearward direction would effect reverse movement of the machine. Movement of the lever A to the left will effect a left turn, and movement to the right will effect a right turn, all in a well-known manner. The control lever indicated at B is employed to engage or disengage a master clutch (not shown) between the motor and the differential. The lever C is for control of the hydraulic jack 4 to tilt the machine frame in a vertical plane. Control lever D controls the hydraulic jacks 69 to effect raising and lowering of the secondary frame 10. The control lever E controls hydraulic jacks 150 (Figs. 1 and 3a) to control the vertical positioning of the portion 7 of the conveyor. Control lever F controls a pair of hydraulic jacks 160 (Fig. 4a) to effect lateral swinging of the portion 7 of the conveyor. The letter G (Fig. 4a) indicates a master switch to control starting and stopping of the motor 105. No hydraulic conduits or valves are herein shown since they are susceptible to a wide variety of adaptations and their manner of employment to effect control of hydraulic mechanisms is well known. The inclusion of all such elements in the drawings and the manner of control thereof by the control levers would render the disclosure extremely complicated. The particular controls described do not constitute a part of this invention and may be modified quite considerably without departing from the invention disclosed. Clearly, employment of a plurality of electric motors, as suggested above, would necessitate appropriate changes in the number and arrangement of control levers.

In operation, the machine will be moved forwardly toward the face of the mineral to be mined until the undercutting burr 33 approaches the face of the mineral and the operator will then set the controls to continuously drive the endless tread carriage forwardly at a reduced speed and will put the undercutter and the breaking down mechanism in operation. At this time the conveyor will also begin to operate. As the machine advances the burr 33 will start to cut the kerf 18 and the surface 16 of the frame members 20 will enter the kerf and make contact with the downwardly facing surface thereof. At about this time the pick points 13 and 14 will be in position to start breaking down mineral from the face during their downward movement along the forward part of their orbital paths. At the top of the path the picks will be moving forwardly and will enter the mineral face in a forwardly and downwardly direction and will crush mineral therefrom until they approach a position adjacent the bottom of their downward movements. At this time there is great likelihood of the mineral immediately above the undercut 17 breaking off in a large lump, a lump too large to be handled by the conveyor in the limited space thereover and lumps too large to be commercially usable. After such lumps have fallen onto the breaker plate 42 of the conveyor they will be broken by further downward movement of the central pick arms, as described previously. As has been stated, the pick points 13 are located below and forwardly of the points 14. Thus the mineral removed by the upper points 14 is, in effect, "undercut" by the points 13. The operator of the machine may at any time manipulate the proper control lever to adjust the working height of the picks by raising or lowering the secondary frame 10 about the axis 11 to thereby cause the upper picks 14 to just reach the top of the vein of mineral at the uppermost part of its path.

In the event the vein of mineral changes direction in the vertical plane, the operator need only manipulate the controls described to effect tilting of the main frame about the front axle 2 to thus change the direction of the machine to follow the changed direction of the vein of mineral material so that the undercutter and picks are headed in the proper direction even though the carriage 3 is traveling on a portion of the floor extending in a different direction.

Although a single specific embodiment has been described in detail, it is to be understood that many modifications may be resorted to without departing from the invention as defined in the appended claims.

I claim:

1. In a mining machine, a frame movable toward the face of a mineral to be mined, breaking down means on said frame comprising, a pair of forwardly directed pick heads fixed relative to each other, one of said pick heads being below and forwardly of the other in a common vertical plane, and means for moving said pick heads in an orbital path with downward movement at the forward portion thereof, and means for relative adjustment of said pick heads about a common axis rearwardly thereof to vary the spacing therebetween.

2. In a mining machine, a frame movable toward the face of a mineral to be mined, breaking down mechanism carried by said frame and comprising a forwardly extending pick arm, a pick head carried by the foremost end of said arm, means supporting an intermediate portion of said arm for movement in a circular path in a vertical plane, a link pivoted to said frame and to the rearward portion of said arm to guide the said rearward portion along an arcuate path extending generally in a fore and aft direction whereby to cause said pick head to move in an orbital path in a vertical plane.

3. In a mining machine, a frame movable toward the face of a mineral to be mined, a shaft rotatably mounted on said frame, an eccentric on said shaft, a first member journalled on the periphery of said eccentric and carrying a forwardly directed pick head, a second member attached to a side of said first member and having a portion engaging a side face of said eccentric, said second member carrying a forwardly directed pick head vertically spaced from said first pick head and being adjustable relative to said first member about the center of said eccentric, and said second member having a rearwardly extending portion guided for movement along a path generally fore and aft of said frame.

4. In a mining machine, a frame movable toward the face of a mineral to be mined, a shaft rotatably mounted on said frame, an eccentric on said shaft, a first member journalled on the periphery of said eccentric and carrying a forwardly directed pick head, a second member having portions attached to opposite sides of said first member, said portions engaging the opposed side faces of said eccenttric, said second member carrying a forwardly directed pick head vertically spaced from said first pick head and being adjustable relative to said first member about the center of said eccentric, and said second member having a rearwardly extending portion guided for movement along a path generally fore and aft of said frame.

5. In a mining machine, a frame movable forwardly toward the face of a mineral to be mined, a shaft rotatably mounted on said frame on a transverse axis, a first member having spaced side walls with aligned openings therethrough mounted on said frame with said shaft extending into said aligned openings, an eccentric larger than said openings mounted on said shaft between said side walls, means guiding the rear portion of said first member for movement along a generally fore and aft path relative to said frame, a second member between said side walls and journalled to the periphery of said eccentric, means removably securing the said side walls to the said second member whereby said members may be relatively adjusted about said eccentric, and a forwardly directed pick head carried by each of said members.

6. A mining machine as set forth in claim 5 in which the pick head on one of said members is below and forwardly of the pick head on the other of said members.

7. In a mining machine, a frame, a first member comprising a pair of spaced parallel side plates, a pick head carried by said member, aligned openings in said side plates to the rear of said pick head, a shaft journalled on said frame and extending through said aligned openings, an eccentric fixed to said shaft and lying in a plane between said side plates, a second member between said side plates and journalled to the periphery of said eccentric, means removably securing said second member to said side plates, and a pick head secured to a portion of said second member projecting from between said side plates adjacent said first pick head.

8. In a mining machine, a frame, a first member comprising a pair of spaced parallel side plates, a pick head rigidly attached to the edges of said plate and acting to hold said plates in fixed spaced relationship, a link pivoted at one end to said frame, the other end of said link extending between and pivoted to said plates at a point spaced from said pick head, aligned openings in said side plates between said pick head and said link pivot, a shaft journalled to said frame and extending through said aligned openings, an eccentric fixed to said shaft and lying in a plane between said side plates, a second member between said side plates and journalled to the periphery of said eccentric, means removably securing said second member to said side plates, and a pick head secured to a portion of said second member projecting from between said side plates adjacent said first pick head.

9. A mining machine as set forth in claim 8 in which said securing means comprises a circular series of fastening means passing through said side plates and said second member about said openings.

10. In a coal mining machine, a main frame, a secondary frame comprising spaced side members, spreader elements extending between said side members and rigidly attached thereto to rigidly unite said side members, the rearmost portion of said secondary frame being pivotally attached to said main frame on a transverse horizontal axis, a transverse shaft journalled on the forward portion of said secondary frame, a plurality of eccentrics on said shaft, a pick arm mounted intermediate its ends on each of said eccentrics, each of said pick arms terminating at its forward end in a pick head, and the rearmost portion of each pick arm being guided for movement relative to said secondary frame along a path extending generally fore and aft.

11. A mining machine as set forth in claim 10, in which certain of said eccentrics are on said shaft between said side members and at least one eccentric is on a portion of said shaft extending laterally beyond each of said side members and the lateral extremities of said main frame.

12. A mining machine as set forth in claim 10, in which the means for guiding the rearmost portions of said pick arms comprises a generally vertically extending link for each pick arm, each of said links being pivoted at its upper end to said secondary frame and at its lowermost end to one of said pick arms.

13. In a mining machine, a main frame, a secondary frame pivoted to said main frame about a transverse horizontal axis, mineral breaking down means carried by said secondary frame, said secondary frame including a member comprising spaced vertical plates, a toggle linkage in the space between said plates and pivoted at one end to said plates and at the other end to said main frame, and means for operating said linkage to adjust said secondary frame about said axis to in turn vary the working height of said breaking down means.

14. In a mining machine, a main frame, a secondary frame pivoted to said main frame about a transverse horizontal axis, mineral breaking down means carried by said secondary frame, said secondary frame including side members, each side member comprising spaced plates, a toggle linkage in the spaces between said plates, said linkage comprising a link pivoted at one end to said plates and a link pivoted at one end to said main frame, said links being pivoted to each other at their adjacent ends, and means effective to move said common pivot to adjust said secondary frame relative to said main frame.

15. In a mining machine, breaking down mechanism comprising a plurality of picks movable in an orbital path in a vertical plane, rigid platform means below said pick means to receive broken down mineral, said pick means including forwardly directed pointed elements for breaking down mineral and additional pointed elements rearwardly thereof and directed downwardly toward said platform means whereby large pieces of mineral on said platform means will be broken by said downwardly directed points upon downward movement of said picks.

16. In a mining machine, a frame, mineral dislodging means movably carried by said frame, a motor on said frame, power transmitting means for driving said dislodging means from said motor, said transmitting means comprising a differential driven by said motor and parallel chain drives from the two output shafts of said differential to said dislodging means.

17. In a mining machine, a main frame, a secondary frame, the rearmost portion of said secondary frame being pivotally attached to said main frame on a transverse horizontal axis, a transverse shaft journalled to the forward portion of said secondary frame, a plurality of eccentrics on said shaft, a pick arm mounted intermediate its ends on each of said eccentrics, each of said pick arms terminating at its forward end in a pick head, and the rearmost portion of each pick arm being guided for movement relative to said secondary frame along a path extending generally fore and aft, a motor on said main frame, means for transmitting power from said motor to said shaft, said last-named means including an element rotatable about said transverse horizontal axis.

18. A machine as defined in claim 17, in which said power transmitting means comprises a differential driven by said motor and in which a pair of said elements are independently rotatable about said axis, said elements being driven by the output shafts of said differential, and separate drive means from each of said elements to said shaft.

19. In a coal mining machine, a main frame, a secondary frame comprising spaced side members, spreader elements extending between said side members and rigidly attached thereto to rigidly unite said side members, the rearmost portion of said secondary frame being pivotally attached to said main frame on a transverse horizontal axis, a transverse shaft journalled to the forward portion of said secondary frame, a plurality of eccentrics on said shaft, a pick arm mounted intermediate its ends on each of said eccentrics, each of said pick arms terminating at its forward end in a pick head, and the rearmost portion of each pick arm being guided for movement relative to said secondary frame along a path extending generally fore and aft, power operated extensible means pivoted at one end to said frame and at the other end to a rear portion of said carriage whereby to tilt said frame about said forward axle.

GEORGE A. MERCHANT.

REFERENCES CITED

The following references are of record in the file of this patent:

UNITED STATES PATENTS

| Number | Name | Date |
|---|---|---|
| 1,753,246 | Newdick | Apr. 8, 1930 |
| 1,796,943 | Pratt | Mar. 17, 1931 |
| 1,834,587 | Halleck | Dec. 1, 1931 |
| 1,917,368 | Hauge | July 11, 1933 |
| 2,368,863 | Miller | Feb. 6, 1945 |
| 2,415,217 | Osgood | Feb. 4, 1947 |
| 2,424,180 | Merchant | July 15, 1947 |

FOREIGN PATENTS

| Number | Country | Date |
|---|---|---|
| 171,042 | Germany | May 15, 1906 |
| 614,452 | Germany | June 8, 1935 |
| 616,779 | Germany | Aug. 8, 1935 |